United States Patent

(12) United States Patent
Lee et al.

(10) Patent No.: US 9,912,396 B2
(45) Date of Patent: Mar. 6, 2018

(54) METHOD OF PROCESSING RECEPTION SIGNAL USING PREPROCESSING FILTER OF MIMO RECEIVER

(71) Applicant: LG ELECTRONICS INC., Seoul (KR)

(72) Inventors: Kilbom Lee, Seoul (KR); Jiwon Kang, Seoul (KR); Kitae Kim, Seoul (KR); Heejin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/300,322

(22) PCT Filed: Feb. 24, 2015

(86) PCT No.: PCT/KR2015/001755
§ 371 (c)(1),
(2) Date: Sep. 29, 2016

(87) PCT Pub. No.: WO2015/167118
PCT Pub. Date: Nov. 5, 2015

(65) Prior Publication Data
US 2017/0180031 A1    Jun. 22, 2017

Related U.S. Application Data

(60) Provisional application No. 61/984,853, filed on Apr. 27, 2014.

(51) Int. Cl.
*H04B 7/08* (2006.01)
*H04B 7/0456* (2017.01)

(52) U.S. Cl.
CPC ......... *H04B 7/0845* (2013.01); *H04B 7/0456* (2013.01)

(58) Field of Classification Search
CPC .......... H04B 7/0413; H04B 7/04; H04B 7/08; H04B 7/0632; H04B 7/0848;
(Continued)

(56) References Cited

U.S. PATENT DOCUMENTS

2010/0086064 A1    4/2010  Jianming et al.
2012/0069769 A1    3/2012  Lain et al.
(Continued)

FOREIGN PATENT DOCUMENTS

JP      2010-93487 A      4/2010
KR   10-2012-0004561 A   1/2012
(Continued)

*Primary Examiner* — Vineeta Panwalkar
(74) *Attorney, Agent, or Firm* — Birch, Stewart, Kolasch & Birch, LLP

(57) ABSTRACT

A method of processing a reception signal and a MIMO receiver are disclosed. The method includes the steps of selecting a reference RE from an RE group including a plurality of REs, generating a preprocessing filter to be shared by the plurality of the REs belonging to the RE group based on channel information of the reference RE and generating detection signals for the plurality of the REs in a manner of compensating reception signals for each of the plurality of the REs using the preprocessing filter and channel information of each of the plurality of the REs.

14 Claims, 10 Drawing Sheets

(58) Field of Classification Search
CPC ............... H04B 7/0845; H04B 7/0456; H04L 25/03968; H04L 43/028
See application file for complete search history.

(56) References Cited

U.S. PATENT DOCUMENTS

| | | |
|---|---|---|
| 2012/0114058 A1 | 5/2012 | Gan et al. |
| 2012/0129457 A1* | 5/2012 | Linsky ................... H04B 1/525 455/63.3 |
| 2013/0051505 A1 | 2/2013 | Singh et al. |
| 2013/0294547 A1 | 11/2013 | Lane et al. |
| 2014/0064354 A1 | 3/2014 | Nakano et al. |
| 2015/0092583 A1* | 4/2015 | Balraj ................... H04L 1/0003 370/252 |
| 2015/0326364 A1* | 11/2015 | Koivisto ................ H04L 5/006 370/329 |

FOREIGN PATENT DOCUMENTS

| | | |
|---|---|---|
| WO | 2013/155908 A1 | 10/2013 |
| WO | 2015/137603 A1 | 9/2015 |

\* cited by examiner time domain (Doppler)

frequency domain (channel delay profile)

METHOD OF PROCESSING RECEPTION SIGNAL USING PREPROCESSING FILTER OF MIMO RECEIVER

CROSS-REFERENCE TO RELATED APPLICATIONS

This application is the National Phase of PCT International Application No. PCT/KR2015/001755, filed on Feb. 24, 2015, which claims priority under 35 U.S.C. 119(e) to U.S. Provisional Application No. 61/984,853, filed on Apr. 27, 2014, all of which are hereby expressly incorporated by reference into the present application.

BACKGROUND OF THE INVENTION

Field of the Invention

The present invention relates to a method of reducing implementation complexity and memory demand while performance degradation of a receiver is minimized in massive multiple input multiple output (MIMO) environment.

Discussion of the Related Art

A MIMO system corresponds to a wireless communication system using multiple transmission antennas and multiple reception antennas. The MIMO system minimizes a fading impact occurring on a radio channel using a diversity scheme and can enhance throughput by simultaneously transmitting a plurality of streams using spatial multiplexing. In case of the special multiplexing (SM) scheme, when the number of transmission antennas corresponds to $N_t$ and the number of reception antennas corresponds to $N_r$, the maximum number of transmittable streams corresponds to min ($N_t$, $N_r$). In particular, it is already known that inclination of communication capacity is shown as min ($N_t$, $N_r$) in high SNR. Since the communication capacity corresponds to maximum throughput capable of being logically transmitted on a given channel, if the number of transmission antennas and the number of reception antennas are increasing at the same time, the communication capacity is also increasing.

A massive MIMO system including the huge number of transmission and reception antennas is receiving attention as one of technologies constructing 5G. Many theses and experiments assume the MIMO system as a single base station (including a distributed antenna system) equipped with a plurality of antennas and a plurality of user equipments equipped with a single antenna. In this case, although a user equipment is equipped with a single antenna, since a plurality of the user equipments are receiving a service from a single base station at the same time, a channel between the base station and all of a plurality of the user equipments can be comprehended as MIMO. If the number of all user equipments is defined as K, the aforementioned inclination of the communication capacity in the high SNR can be represented by min ($N_t$, K).

Meanwhile, when a base station including the logically infinite number of transmission antennas transmits data to a plurality of user equipments, an optimal transmission algorithm of the base station corresponds to a maximal ratio transmission (MRT) algorithm. Meanwhile, when a base station receives data transmitted to the base station by a plurality of user equipments, an optimal reception algorithm of the base station corresponds to a maximal ratio combining (MRC) algorithm. Since the MRT and the MRC do not consider interference, performance degradation may occur when the base station is equipped with the finite number of antennas. Yet, if the base station is equipped with the infinite number of antennas, since the interference is gone, the MRT and the MRC may become an optimal solution.

Since a base station can make a beam to be thin (sharp) via antenna beamforming, the base station can concentrate energy on a specific user equipment. By doing so, identical information can be delivered using smaller power. On the contrary, since the aforementioned method does not interfere neighboring different user equipments, it may become a method capable of minimizing performance degradation of a system due to interference.

SUMMARY OF THE INVENTION

The present invention is devised to solve the aforementioned general technical problem. One object of the present invention is to minimize reception signal detection complexity while performance of a receiver is maintained in a massive MIMO environment.

Another object of the present invention is to actively control reception signal detection complexity by controlling a target performance of a transmitter and a receiver according to communication environment.

The other object of the present invention is to enhance a speed of processing a reception signal and enable a signal processing to be efficiently performed by making a MIMO receiver utilize a preprocessing filter.

Technical tasks obtainable from the present invention are non-limited the above mentioned technical tasks. And, other unmentioned technical tasks can be clearly understood from the following description by those having ordinary skill in the technical field to which the present invention pertains.

To achieve these and other advantages and in accordance with the purpose of the present invention, as embodied and broadly described, according to one embodiment, a method of processing reception signals by a MIMO receiver having a plurality of antennas. The MIMO receiver selects a reference resource element (RE) from an RE group including a plurality of REs, generates a preprocessing filter to be shared by the plurality of the REsbased on channel information of the reference RE, and generates detection signals for the plurality of the REs by compensating the reception signals for each of the plurality of the REs using the preprocessing filter and channel information of each of the plurality of the REs.

The preprocessing filter may correspond to a matrix used for enhancing accuracy of the generation of detection signals by compensating the reception signals.

The preprocessing filter can be generated by using a Jacobi algorithm, a Gauss-Seidel algorithm, a successive over relaxation (SOR) preconditioning algorithm, or an incomplete Cholesky factorization algorithm based on the channel information of the reference RE.

The preprocessing filter can be generated by generating a diagonal matrix by approximating the channel information of the reference RE and applying a Jacobi algorithm to the diagonal matrix.

The detection signals generating step includes repeatedly performing the compensation process, until a value of an error between application of a minimum mean square error (MMSE) filter, a zero forcing (ZF) filter and an interference rejection combining (IRC) filter or a Bell Laboratories Layer Space-Time (BLAST) filter applied to each of the plurality of the REs instead of the preprocessing filter and the detection signal falls below a threshold value, and the maximum number of times that the compensation process is performed is determined according to a MIMO channel environment or a user input.

The detection signals can be generated by applying the preprocessing filter and a conjugate gradient (CG) algorithm, a Newton method algorithm, or a steepest descent method algorithm together with the channel information of each RE to the reception signals.

The preprocessing filter generating step includes generating the preprocessing filter in consideration of channel information of the plurality of the REs in addition to the channel information of the reference RE.

The method can further include the step of decoding the detection signals for the plurality of the REs.

To further achieve these and other advantages and in accordance with the purpose of the present invention, as embodied and broadly described, according to a different embodiment, a method of processing a reception signal, which is processed by a MIMO receiver having a plurality of antennas, includes the steps of selecting a reference RE from an RE group including a plurality of REs, generating a preprocessing filter and a common filter to be shared by the plurality of the REs based on channel information of the reference RE, detecting first signals of which channel impact is eliminated from each of the plurality of the REs by applying the common filter to the reception signals for each of the plurality of the REs, and generating second signals by compensating the first signals of REs except the reference RE among the plurality of the REs using the preprocessing filter and channel information of each of the plurality of the REs.

The preprocessing filter may be identical to the common filter or can be generated using an incomplete Cholesky factorization algorithm or a complete Cholesky factorization algorithm based on the channel information of the reference RE.

To further achieve these and other advantages and in accordance with the purpose of the present invention, as embodied and broadly described, according to a further different embodiment, a method of processing a reception signal, which is processed by a MIMO receiver having a plurality of antennas configured to receive reception signals, includes the steps of selecting a reference RE from an RE group including a plurality of REs, generating a common filter to be shared by the plurality of the REs based on channel information of the reference RE, detecting first signals of which channel impact is eliminated from each of the plurality of the REs by applying the common filter to reception signals for each of the plurality of the REs, generating preprocessing filters to be applied to each of the plurality of the REs except the reference RE based on channel information of REs except the reference RE among the plurality of the REs, and generating second signals by compensating the first signals of REs except the reference RE using a preprocessing filter and channel information of each of the plurality of the REs.

To achieve these and other advantages and in accordance with the purpose of the present invention, as embodied and broadly described, according to one embodiment, a MIMO receiver has a plurality of antennas configured to receive reception signals, and a processor configured to select a reference RE from an RE group including a plurality of REs, generate a preprocessing filter to be shared by the plurality of the REs based on channel information of the reference RE, and generate detection signals for the plurality of the REs by compensating the reception signals for each of the plurality of the REs using the preprocessing filter and channel information of each of the plurality of the REs.

To further achieve these and other advantages and in accordance with the purpose of the present invention, as embodied and broadly described, according to a different embodiment, a MIMO receiver has a plurality of antennas configured to receive reception signals, and a processor configured to select a reference RE from an RE group including a plurality of REs, generate a preprocessing filter and a common filter to be shared by the plurality of the REs based on channel information of the reference RE, detect first signals of which channel impact is eliminated from each of the plurality of the REs by applying the common filter to the reception signals for each of the plurality of the REs, generate second signals by compensating the first signals of REs except the reference RE among the plurality of the REs using the preprocessing filter and channel information of each of the plurality of the REs.

To further achieve these and other advantages and in accordance with the purpose of the present invention, as embodied and broadly described, according to a further different embodiment, a MIMO receiver has a plurality of antennas configured to receive reception signals, select a reference RE from an RE group including a plurality of REs, generate a common filter to be shared by the plurality of the REs based on channel information of the reference RE, detect first signals of which channel impact is eliminated from each of the plurality of the REs by applying the common filter to the reception signals for each of the plurality of the REs, generate preprocessing filters to be applied to each of the plurality of the REs except the reference RE based on channel information of REs except the reference RE among the plurality of the REs, generate second signals by compensating first signals of REs except the reference RE using a preprocessing filter and channel information of each of the plurality of the REs.

It is to be understood that both the foregoing general description and the following detailed description are exemplary and explanatory and are intended to provide further explanation of the invention as claimed.

Accordingly, the present invention provides the following effects or advantages.

First of all, as a correlation between REs is getting bigger, signal detection complexity of a receiver becomes reduced. Although the correlation is small, complexity can be reduced without a loss of performance.

Secondly, since reception signal detection complexity can be controlled as necessary, performance control can be adaptively performed according to communication environment.

Thirdly, it is able to promptly and precisely process a reception signal in a manner that a receiver utilizes a preprocessing filter compared to a case that the receiver does not utilize the preprocessing filter.

Effects obtainable from the present invention may be non-limited by the above mentioned effect. And, other unmentioned effects can be clearly derived and understood from the following description by those having ordinary skill in the technical field to which the present invention pertains. Moreover, the present invention may have an unexpected advantage while those skilled in the art implement the present invention based on the following description.

BRIEF DESCRIPTION OF THE DRAWINGS

The accompanying drawings, which are included to provide a further understanding of the invention, provide embodiments of the present invention together with detailed explanation. A technical characteristic of the present invention may be non-limited by a specific drawing. A new embodiment can be configured by combining characteristics disclosed in each drawing with each other. Reference numerals in each drawing mean structural elements.

DETAILED DESCRIPTION OF THE INVENTION

Figure 1:
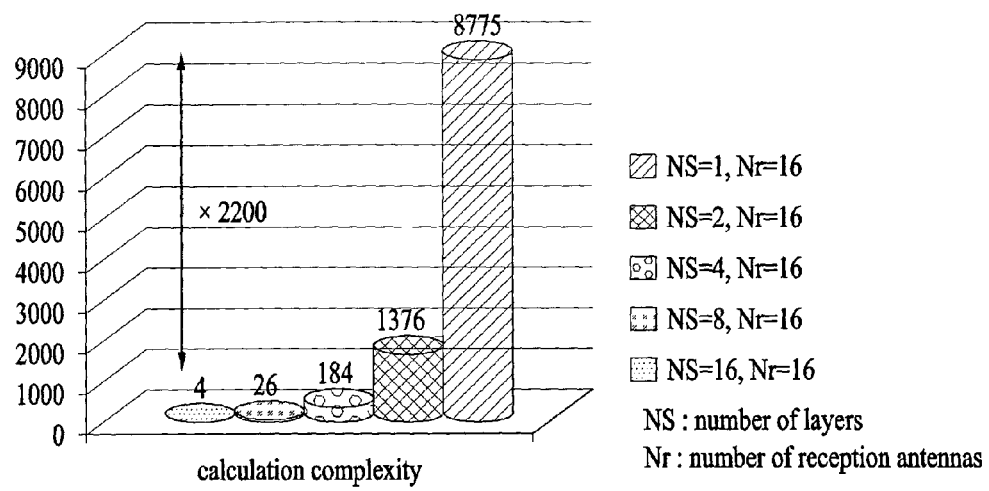
FIG. 1 is a diagram for calculation complexity according to the number of received streams in MIMO (multiple input multiple output) environment in accordance with the present invention.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

The following embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment.

Procedures or steps probably making the point of the present invention unclear are skipped and procedures or steps understandable by those skilled in the art are also skipped as well.

In the present application, such a terminology as 'comprise', 'include' or the like should be construed not as excluding a different component but as further including the different component unless there is a special citation. And, in the present specification, such a terminology as ' . . . unit', ' . . . device', 'module' or the like means a unit for processing at least one function or an operation and can be implemented by a hardware, a software, or a combination thereof. Moreover, "a or an", "one", "the" or a similar related word can be used as a meaning including both a singular number and a plural number in the following contexts (in particular, in the following contexts of the claims) unless it is clearly contradicted to a context of the present invention.

In the present specification, the embodiments of the present invention are explained in a manner of mainly concerning data transmission and reception between a base station and a mobile station. In this case, the base station has a meaning of a terminal node of a network performing a direct communication with the mobile station. In the present disclosure, a specific operation, which is explained as performed by the base station, may be performed by an upper node of the base station in some cases.

In particular, in a network constructed with a plurality of network nodes including a base station, it is apparent that various operations performed for communication with a mobile station can be performed by the base station or other networks except the base station. 'Base station (BS)' may be substituted with such a terminology as a fixed station, a Node B, an eNode B (eNB), an advanced base station (ABS), an access point (AP) and the like.

And, a mobile station (MS) may be substituted with such a terminology as a user equipment (UE), a subscriber station (SS), a mobile station subscriber station (MSS), a mobile terminal (MT), an advanced mobile station (AMS), a terminal, and the like.

And, a transmitting end corresponds to a fixed and/or mobile node providing a data service or an audio service and a receiving end corresponds to a fixed and/or mobile node receiving the data service or the audio service. Hence, a mobile station becomes the transmitting end and a base station may become the receiving end in uplink. In the same manner, the mobile station becomes the receiving end and the base station may become the transmitting end in downlink.

And, when a device performs communication with a 'cell', it may indicate that the device transceiver a signal with a base station of the cell. In particular, although the device actually transmits and receives a signal with a specific base station, for clarity, it may be represented as the device transmits and receives a signal with a cell formed by the specific base station. Similarly, a 'macro cell' and/or 'small cell' may indicate a specific coverage, respectively. Moreover, the 'macro cell' and/or the 'small cell' may indicate a 'macro base station supporting the macro cell' and a 'small cell base station supporting the small cell', respectively.

The embodiments of the present invention can be supported by standard documents disclosed in at least one of IEEE 802.xx system, 3GPP system, 3GPP LTE system and 3GPP2 system. In particular, unmentioned clear steps or parts of the embodiments of the present invention can be explained with reference to the aforementioned standard documents.

And, all terminologies disclosed in the present specification can be explained by the aforementioned standard document. In particular, embodiments of the present invention can be supported by at least one of a standard document of IEEE 802.16 including P802.16e-2004, P802.16e-2005, P802.16.1, P802.16p, and P802.16.1b.

In the following, preferred embodiment according to the present invention is explained in detail with reference to attached drawings. Detailed description disclosed together with the accompanying drawings is intended to explain not a unique embodiment of the present invention but an exemplary embodiment of the present invention.

Moreover, specific terminologies used in the embodiments of the present invention are provided to help understanding of the present invention and the use of the specific terminologies can be modified in a different form in a scope without departing from the technical idea of the present invention.

1. Massive MIMO System

In case of constructing a massive MIMO system, it is essential for developing a massive MIMO reception algorithm. Compared to a legacy MIMO system, it is necessary to enhance a receiver in the massive MIMO system in two aspects in the following.

Figure 2:
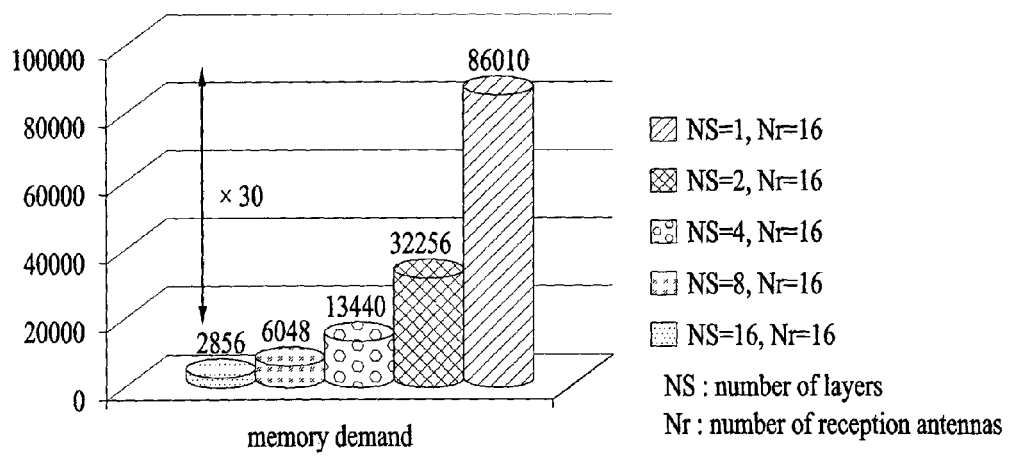
FIG. 2 is a diagram for a memory demand according to the number of received streams in MIMO environment in accordance with the present invention.

First of all, the number of data streams simultaneously received by a receiver increases in massive MIMO environment. If the number of data streams, which should be processed at the same time, increases, it leads to increase of calculation complexity and memory demand in the receiver and it consequently leads to increase of system implementation cost and processing time and may lay a big burden on a reception system. As shown in FIG. 1 and FIG. 2, calculation complexity and memory demand of a legacy MIMO reception algorithm exponentially increase according to the number of received streams.

Secondly, as the number of interference causing sources is increasing in the massive MIMO environment, it is required to have a reception algorithm equipped with an enhanced interference elimination function. If a base station transmits data to dozens or hundreds of users at the same time in the massive MIMO system, each of the users receive multiple user interference signals more than dozens as well as a data signal transmitted to the user. Hence, it is necessary to have a massive MIMO reception algorithm to efficiently eliminate the multiple user interference signals from the data transmitted by the base station. And, in case of considering dense small cell environment, it is also required to eliminate interferences received from a neighboring cell and users of the neighboring cell.

In order to solve the aforementioned technical tasks, it should consider technical issues in the following.

First of all, calculation complexity and memory demand increased in massive MIMO environment are explained. If the number of transmission antennas is always greater than the number of reception antennas, the number of streams capable of being transmitted by a transmitter increases in proportion to the number of the reception antennas. In this case, a receiver uses a reception filter to detect each stream from a received signal. In LTE system, a filter should be recalculated in every subframe.

A load due to the calculation process can be quantified by calculation complexity and memory demand. The complexity and the memory demand are proportion to the square or the cube of the number of received streams. Hence, if the number (S) of received streams is big, the calculation complexity and the memory demand are rapidly increasing as shown in FIG. 1. Moreover, since specification of hardware is determined by a worst case, hardware implementation cost is also increasing according to the number of streams.

In the following, calculation complexity and memory demand according to a reception algorithm and/or a filter of a legacy MIMO receiver are explained.

An MRC (maximum ratio combining) algorithm requires a smallest calculation complexity ($O(N_s^2)$) and memory demand. Yet, since the MRC algorithm does not consider interference between streams, the MRC algorithm provides lowest performance (i.e., low reception SINR).

An MMSE (minimum mean square error) filter provides best performance (i.e., high $O(N_s^3)$ reception SINR) among linear detection methods. Yet, complexity is shown as and the MMSE filter requires additional memory as much as $O(N_s^2)$ for inverse matrix calculation. The aforementioned FIG. 1 and FIG. 2 show complexity and memory demand according to the number of received stream of the MMSE filter.

In order to receive streams using the MMSE filter, it is necessary to perform an inverse matrix calculation for a channel matrix. A size of the inverse matrix is determined by the number of received streams. For instance, time taken for high performance FPGA (field programmable gate array) to obtain 15×15 inverse matrix corresponds to about 150 μs. This time delay corresponds to 30% of 500 μs which is coherence time assumed in a LTE channel model.

And, in order to perform an inverse matrix calculation for MMSE reception, it is necessary to perform a process of moving all channel information to a new memory. This process causes considerable delay. And, a processor accesses a memory to perform an inverse matrix calculation. This causes additional delay. This sort of delay considerably increases processing time of a whole system.

Lastly, an IC (interference cancellation) filter corresponds to a non-linear detection method. In case of a D-BLAST receiver, which is an example of the IC, it may be able to obtain performance corresponding to maximum communication capacity. In case of a V-BLAST receiver, which has implementation complexity less complex than the D-BLAST, the V-BLAST receiver is configured by a form of which MMSE and SIC are combined with each other. In particular, the V-BLAST receiver shows performance close to the maximum communication capacity as selectivity of a channel is getting higher in MIMO-OFDM environment. Yet, since the V-BLAST is also used based on the MMSE filter, the V-BLAST requires complexity and memory demand higher than the MMSE.

And, the IC scheme controls interference by eliminating a previously detected symbol and a layer from a reception signal. Hence, if a previously detected value has an error, an error propagation phenomenon occurs in a manner that a following detection performance is considerably declining. Although various IC algorithms of which the aforementioned problem is compensated are proposed, there is a problem of complexity more complex than a legacy algorithm.

Figure 3:
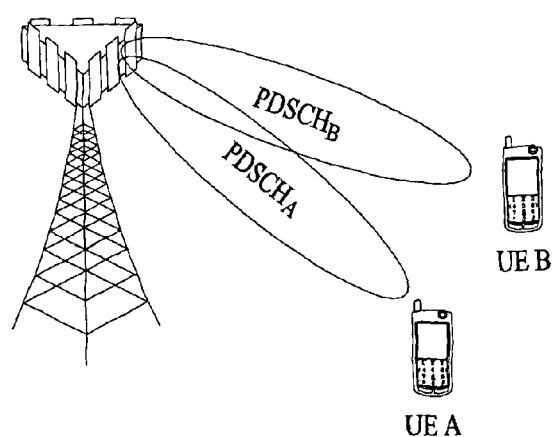
FIG. 3 is a diagram for interference between user equipments within an identical cell in MIMO environment in accordance with the present invention.
Figure 4:
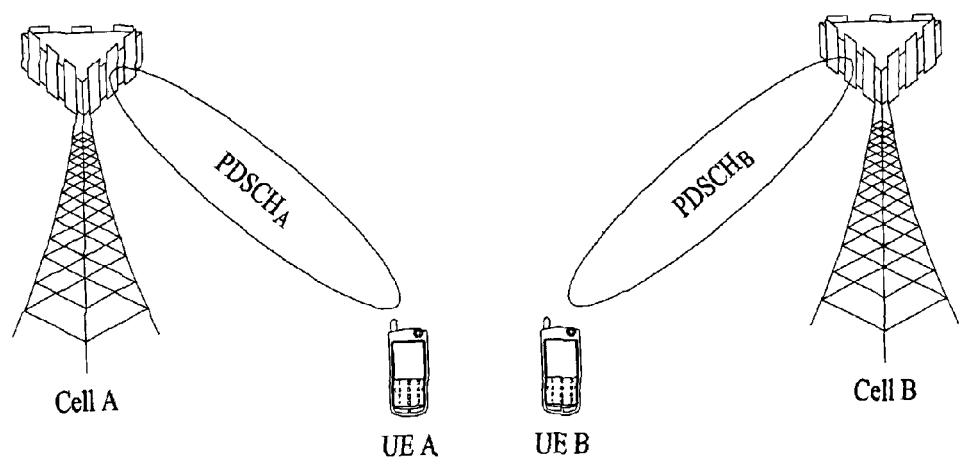
FIG. 4 is a diagram for interference between neighboring cells in MIMO environment in accordance with the present invention.

FIG. 3 is a diagram for interference between user equipments within an identical cell in MIMO environment in accordance with the present invention. FIG. 4 is a diagram for interference between neighboring cells in MIMO environment in accordance with the present invention. In addition to the aforementioned increase of calculation complexity and memory demand, interference occurring in massive MIMO environment is explained with reference to FIG. 3 and FIG. 4 in the following.

When a plurality of antennas are installed in a base station, as shown in FIG. 3, the base station can support a plurality of user equipments at the same time. In this case, a signal transmitted to a user equipment A (UE A) by the base station acts as interference to a user equipment B (UE B). Similarly, a signal transmitted to the UE B acts as interference to the UE A. Since both the interference and a desired signal are transmitted from the identical base station, the interference and the desired signal experience an identical path loss. Hence, since power of the interference signal is received in a manner of being identical to power of the desired signal, reception SINR is rapidly reduced. In order to solve the aforementioned problem, the base station may perform MU-MIMO (multi user-MIMO) precoding in a direction minimizing the interference. Yet, in this case, it is also difficult to completely eliminate multi user interference due to an error of channel information, a channel aging phenomenon, a restriction on a codebook size and the like.

And, in case of considering multi cell environment, there exist various inter-cell interferences. As a representative case, in environment shown in FIG. 4, a UE A and a UE B receive interference impact from a base station B and a base station A, respectively. In particular, when a user equipment is positioned in the vicinity of a boundary of a neighboring cell, the user equipment receives stronger interference from the neighboring base station. Moreover, if a space between cells (e.g., a micro cell, a pico cell, a femto cell and the like) is narrow, it is highly probable for a user equipment to receive strong interference from a neighboring base station.

When a dense multi cell environment to which massive MIMO is introduced is considered, it is essential to enhance an interference elimination capability of a MIMO receiver. In particular, if there exist strong interference, it is necessary to have an interference elimination reception algorithm related to IC (interference cancellation). It is necessary for a legacy IC receiver to have the number of reception antennas greater than the number of interference sources. For instance, in order for the receiver to eliminate 10 interference sources, it is necessary for the receiver to have 11 reception antennas. In case of a small user equipment in which the sufficient number of antennas are hard to be installed, it is necessary to introduce a method capable of overcoming the aforementioned limitation. For instance, it may apply an enhanced IS (interference suppression) technology to multi users and multi cell interference. Or, a transmitter may align interference to a specific signal space using an interference alignment technology and may be then able to eliminate interference received from many interference sources using the limited number of reception antennas by applying a receiver related to the IC (interference cancellation).

Figure 5:
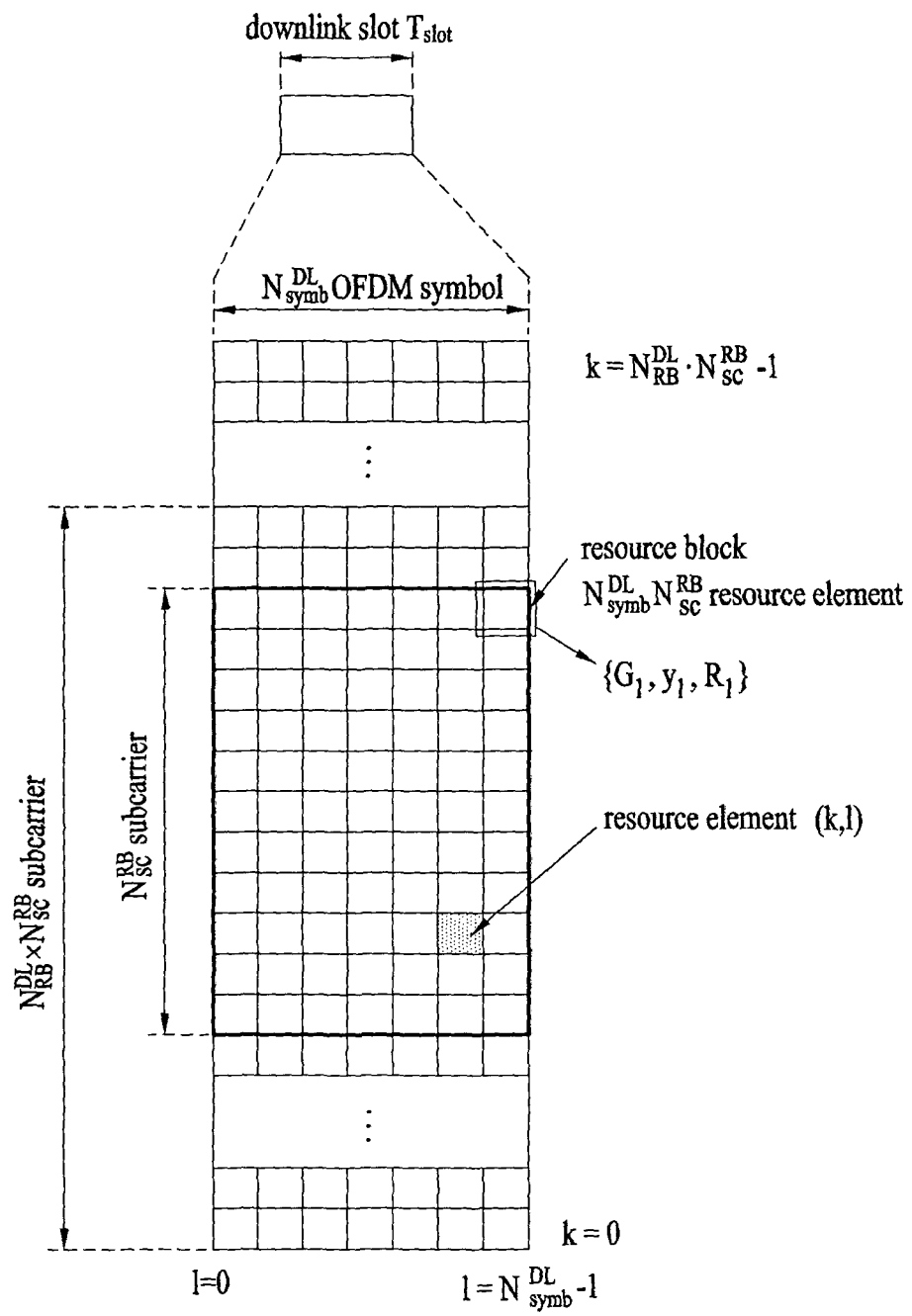
FIG. 5 is a diagram for a structure of a resource block (RB) allocated to a user equipment in accordance with the present invention.
Figure 6:
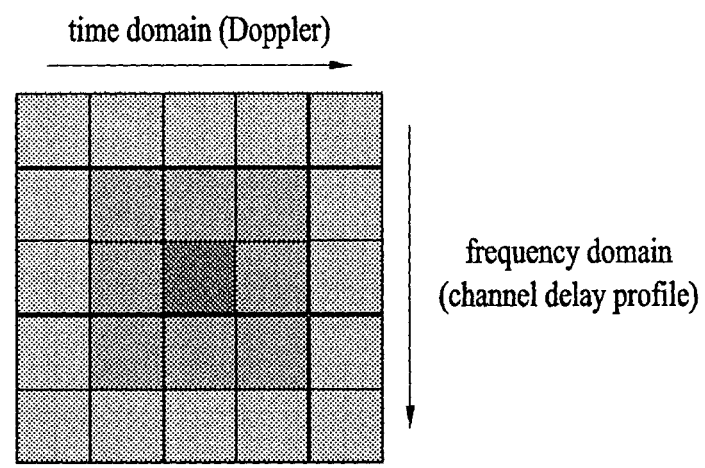
FIG. 6 is a diagram for an RE group formed by a plurality of resource elements in accordance with the present invention.
Figure 7:
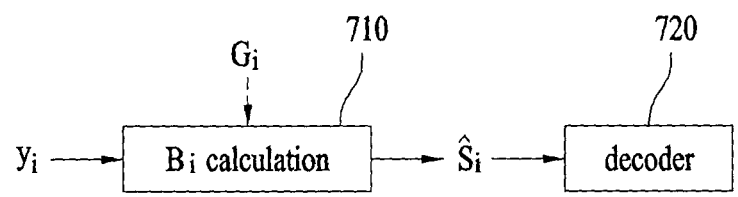
FIG. 7 is a flowchart for an operating process of a legacy MIMO receiver in accordance with the present invention.

In the following, an operation algorithm of a legacy MIMO receiver is explained in relation to the aforementioned problems. FIG. 5 is a diagram for a structure of a resource block (RB) allocated to a user equipment in accordance with the present invention. FIG. 6 is a diagram for an RE group formed by a plurality of resource elements in accordance with the present invention. FIG. 7 is a flowchart for an operating process of a legacy MIMO receiver in accordance with the present invention.

FIG. 5 shows an RB allocated to a specific user equipment. A vertical axis and a horizontal axis indicate a frequency axis and a time axis, respectively. One RB consists of $N_{SC}^{RB} N_{symb}^{DL}$ number of REs. A signal received in each RE can be represented as Formula 1 in the following.

$$y_l = G_l s_l + i_l + w_l, \; l = 0, \ldots, N_{SC}^{RB} N_{symb}^{DL} - 1 \quad \text{[Formula 1]}$$

In Formula 1, l indicates an index of an RE, $G_l$ indicates a channel estimated via a DMRS (de-modulation reference signal), $s_l$ indicates a transmission signal and $I_l$ indicates interference. $w_l$ Indicates white noise and a covariance matrix of the $w_l$ corresponds to $\sigma_w^2 I$.

Meanwhile, as mentioned in the foregoing description, a receiver may use an MMSE (minimum mean square error) filter to eliminate an impact of a channel from a reception signal. A transmission signal detected from a reception signal using the MMSE filter can be represented as Formula 2 in the following.

$$\hat{s}_l = B_l y_l \text{ with } B_l = (G_l^H G_l + R_l)^{-1} B_l^H \quad \text{[Formula 2]}$$

In Formula 2, $B_l$ indicates an MMSE filter and $\hat{s}_l$ corresponds to a transmission signal estimated via the MMSE filter. A covariance matrix $R_l$ is defined by $R_l = i_l i_l^H + \sigma_w^2 I$. In this case, calculation complexity of complex number multiplication necessary for estimating a transmission signal using the MMSE filter can be schematically represented by Formula 3 in the following.

$$\left( \frac{1}{2} N_r N_s^2 + \frac{1}{2} N_s^3 + N_s^2 + N_r N_s \right) N_{RB}^{DL} N_{symb}^{DL} \quad \text{[Formula 3]}$$

In case of massive MIMO, there is a plurality of reception antennas. In this case, the number of streams ($N_s$) as many as the maximum number of antennas can be received. In this case, communication capacity of a receiver can be enhanced as much as $N_s$, times. Yet, complexity rapidly increases in proportion to the cube ($O(N_s^3)$) of the stream number. Hence, when the number of reception streams is big, it is necessary to have a receiver capable of minimizing performance degradation and processing the reception streams with low complexity.

Meanwhile, FIG. 6 shows a part of the RB shown in FIG. 5 and an RE group consisting of a plurality of REs. In the RE group, channels of each RE may have correlation with each other. In particular, if a Doppler effect is small (if a receiver moves slowly or is stationary), correlation of REs positioned at an identical horizontal axis is big. Meanwhile, if power delay spread of a channel is small, correlation of REs positioned at an identical vertical axis is big. If the Doppler effect is small and the power delay spread is small, correlation of all REs shown in FIG. 6 becomes big. In FIG. 6, correlation between a center RE and a surrounding RE is represented by depth of shadow. In particular, as shade of each RE is getting dark, correlation with the center RE is bigger. On the contrary, as shade of each RE is getting brighter, the correlation with the center RE is smaller.

As shown in FIG. 7, a legacy MIMO receiver detects a transmission signal in a manner of performing an identical process in every RE without considering the correlation between REs. In particular, the legacy MIMO receiver calculates a filter $B_i$ from channel information $G_i$ in every RE in response to a reception signal [S710] and passes through a decoding process in a manner of detecting a transmission signal in each RE [S720]. Yet, as mentioned in the foregoing description, due to the increase of calculation complexity and memory demand resulted from the increase of the number of streams in massive MIMO environment, it is necessary to enhance the legacy reception algorithm.

In the following, a MIMO receiver, which operates according to an algorithm including less complexity and providing performance identical to performance of the legacy algorithm using the aforementioned correlation between REs, is proposed.

2. Operation Algorithm of Proposed MIMO Receiver

Figure 8:
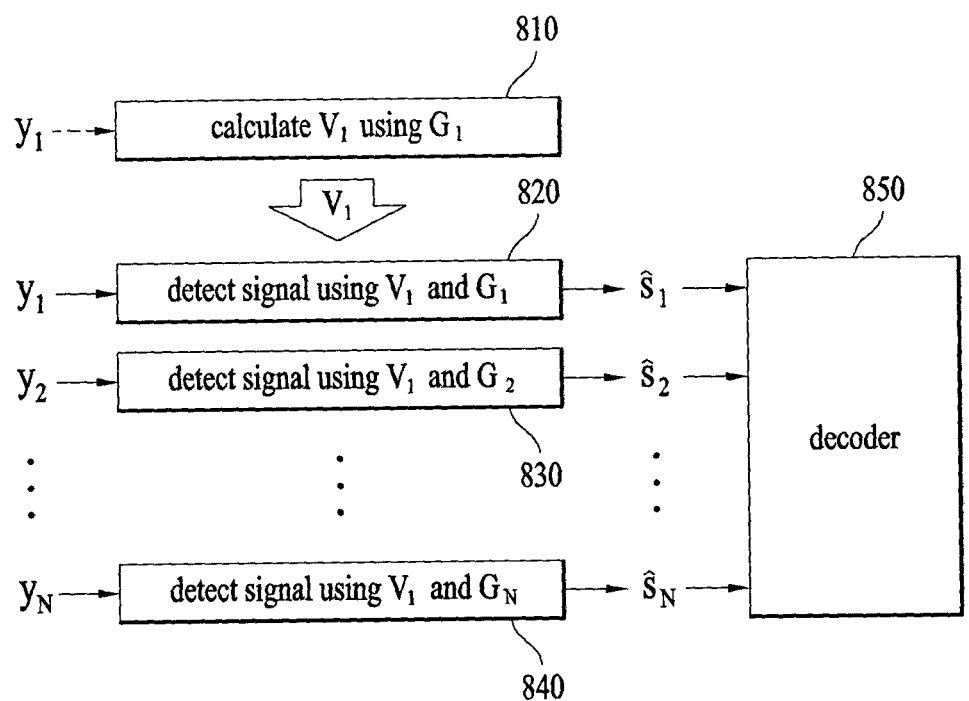
FIG. 8 is a flowchart for an operating process of a MIMO receiver according to one embodiment of the present invention.

FIG. 8 is a flowchart for an operating process of a MIMO receiver according to one embodiment of the present invention.

As mentioned earlier in FIG. 6, a MIMO receiver according to one embodiment of the present invention configures a plurality of REs of which correlation between channels is relatively big as an RE group (having a size of N). In the following description, a signal $\hat{s}_l$ detected from a reception signal of an $l^{th}$ RE of the RE group using a reception signal detector (e.g., MMSE filter) is defined as 'a detection signal'. In case of the MIMO receiver mentioned earlier in FIG. 7, if the number of layers is big in a process of detecting a detection signal from a reception signal, a complexity problem shown in FIG. 1 occurs. In order to reduce the complexity, the MIMO receiver proposed by the present invention uses a numerical analysis algorithm (e.g., CG (conjugate gradient)) instead of detecting detection signals of REs belonging to an RE group in a manner of directly calculating an MMSE filter.

In the following, $V_1$ indicates a 'preprocessing filter (or, acceleration filter)' which is generated based on a MIMO channel of a first RE belonging to an RE group. The aforementioned numerical analysis algorithm finds out a value by repeating a calculation process. A repeatedly calculated value is getting close to a precise answer. If the preprocessing filter $V_1$ is utilized in the repeatedly calculating process, the MIMO receiver may find out a preferred value by less number of repetition only (i.e., promptly).

Yet, as mentioned in the foregoing description, generating a preprocessing filter to make speed of finding out a preferred value sufficiently fast also requires high complexity as well. Hence, in order to lower calculation complexity calculating each of preprocessing filters for all REs belonging to an RE group, a preprocessing filter is generated in a specific RE (e.g., the aforementioned first RE) and other REs belonging to the RE group may use the generated preprocessing filter by sharing it with each other. In particular, when the REs belonging to the RE group detect a detection signal, the numerical analysis algorithm utilizes an identical preprocessing algorithm. The aforementioned specific RE (or the first RE) can be defined as a 'reference RE'. The reference RE may indicate an RE simply becoming a reference for calculating a preprocessing filter. The reference RE is irrelevant to an order of an RE or an index of an RE in the RE group.

Hence, if channel correlation between REs in a group is big, the proposed MIMO receiver shares a preprocessing filter generated from an RE with each other in all REs in an RE group [S810] and the numerical analysis algorithm generates a detection signal using the preprocessing filter [S820, S830, S840]. By doing so, the proposed MIMO receiver can implement same performance with complexity less complex than the legacy MIMO receiver. As the channel correlation between the first RE and a different RE is getting bigger in the RE group, the repetition speed reduction effect can be enlarged.

Figure 9:
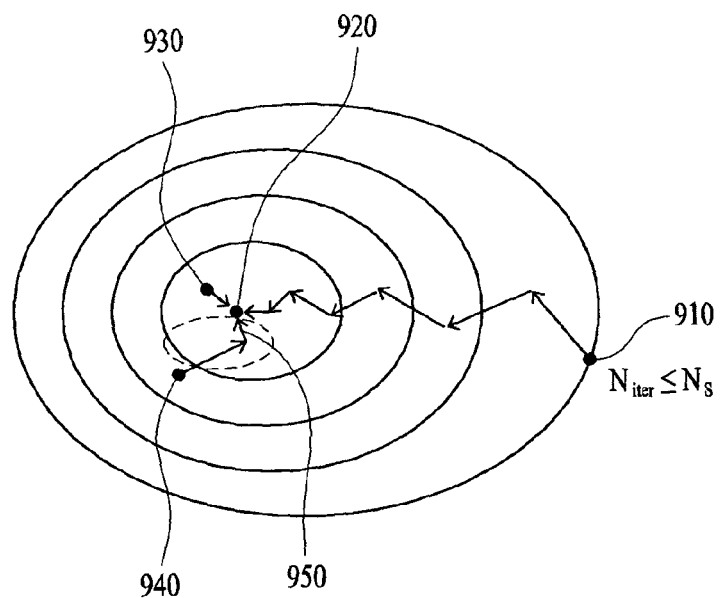
FIG. 9 is a conceptual diagram of a process for a MIMO receiver to detect a detection signal in accordance with the present invention.
Figure 10:
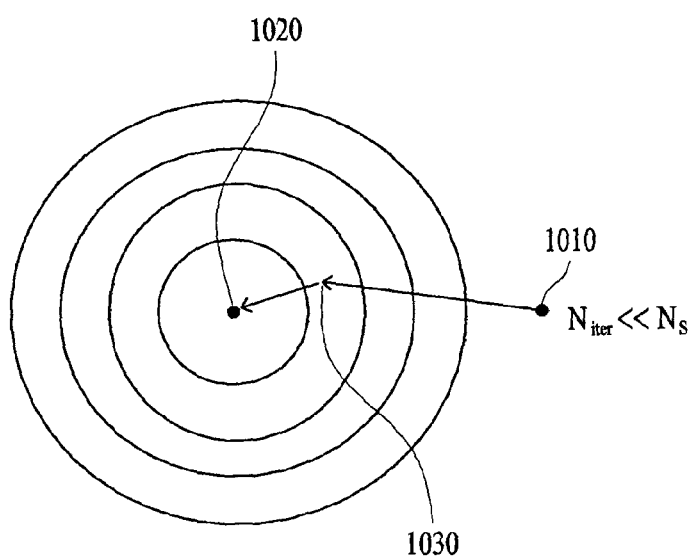
FIG. 10 is a conceptual diagram of a process for a MIMO receiver to detect a detection signal in accordance with the present invention.

FIG. 9 and FIG. 10 are conceptual diagrams of a process for a MIMO receiver to detect a detection signal in accordance with the present invention. FIG. 9 shows a process of detecting a detection signal detected by a MIMO receiver operating according to a scheme of sharing a reception signal detector (or a reception filter) and FIG. 10 shows a process of detecting a detection signal detected by a MIMO receiver operating according to a scheme of sharing the aforementioned preprocessing filter. Each of arrows shown in FIG. 9 and FIG. 10 indicates each of processes of a numerical analysis algorithm repeating calculation.

First of all, in FIG. 9, a center 920 of circles indicates a value preferred by the MIMO receiver, i.e., a precise detection signal. If a detection signal 910 is somewhat different from a precise value, a numerical analysis algorithm can arrive at a precise answer 920 after passing through a repetitive process many times. On the contrary, if a detection signal 930/940 is relatively close to the precise value, the numerical analysis algorithm is able to find out the precise answer 920 by performing the repetitive process at the less number only. Hence, the MIMO receiver operating according to the scheme of sharing the reception filter with each other operates in a direction of which an initial value of a detection signal is getting close to the precise answer (i.e., in a direction having a less error) in a manner of sharing the reception filter with each other.

On the contrary, referring to FIG. 10, a MIMO receiver operating according to a scheme of sharing a preprocessing filter with each other operates in a direction of reducing a repetition count rather than calculating an initial value of a detection signal to be close to a preferred answer (i.e., a center of a circle 1020). In particular, although an initial value 1010, which has a relatively big difference from an answer 1020 preferred by the numerical analysis algorithm, is calculated, the MIMO receiver proposed by the present invention can find out the preferred answer by performing relatively less number of repetition compared to FIG. 9. In other word, the MIMO receiver shown in FIG. 10 rapidly increases convergence speed according to the repetitive calculation of the numerical analysis algorithm and lowers complexity.

In the following, a concrete embodiment of generating a preprocessing filter $V_1$ generated by the MIMO receiver is explained.

According to a first embodiment, a preprocessing filter can be generated by various algorithms including a Jacobi scheme, a Gauss-Seidel scheme, an SOR preconditioning scheme, an incomplete Cholesky factorization scheme and the like.

First of all, a random matrix $A_1$ can be defined as Formula 4 in the following based on a MIMO channel of a reference RE (first RE).

$$A_1 = G_1^\dagger G_1 + R \qquad \text{[Formula 4]}$$

In Formula 4, since the matrix $A_1$ corresponds to a positive definite matrix and has symmetry, the matrix can be disassembled as shown in Formula 5 in the following.

$$A_1 = L_1 + D_1 + L_1^H \quad \text{[Formula 5]}$$

In Formula 5, $L_1$ is a lower triangular matrix and $L_1$ is a diagonal matrix. In Formula 5, a preprocessing filter $V_1$ can be defined according to 3 types of algorithms among the aforementioned various algorithms.

Jacobi scheme: $V_1 = D_1^{-1}$
Gauss-Seidel scheme: $V_1 = (L_1 + D_1)^{-1}$
SOR preconditioning scheme: $V_1 = w(L_1 + wD_1)^{-1}$ (w corresponds to a random constant number)

Among the aforementioned schemes, the Gauss-Seidel scheme and the SOR preconditioning scheme can clearly represent the preprocessing filter $V_1$ by calculating an actual inverse matrix. Yet, in order to reduce calculation complexity of calculating the inverse matrix, the $V_1$ can be calculated via a back substitution process according to Formula 6 in the following instead of precisely calculating the $V_1$.

$$x = V^{-1} y \rightarrow Vx = y \quad \text{[Formula 6]}$$

In Formula 6, if V corresponds to a lower triangular matrix, X corresponding to a value of Formula 6 can be sequentially calculated from the right equation of Formula 6.

In addition to the aforementioned three schemes, in case of applying the incomplete Cholesky factorization scheme, the $A_1$ of Formula 5 can be disassembled to an incomplete Cholesky factor $\hat{L}_1$ shown in Formula 7 in the following. The $\hat{L}_1$ corresponds to a lower triangular matrix.

$$A_1 \approx \hat{L}_1 \hat{L}_1^H \quad \text{[Formula 7]}$$

Although the incomplete Cholesky factorization scheme can disassemble the $A_1$ with less complexity compared to the complete Cholesky factorization scheme, an approximated lower triangular matrix is defined. In case of the incomplete Cholesky factorization scheme, a preprocessing filter $V_1$ is defined as shown in Formula 8 in the following.

$$V_1 = (\hat{L}_1^H)^{-1} \hat{L}_1^{-1} \quad \text{[Formula 8]}$$

The preprocessing filter $V_1$ according to Formula 8 can be precisely represented by directly calculating an inverse matrix. Or, the preprocessing filter can be calculated and represented according to a back substitution process.

The preprocessing filter $V_1$ according to embodiment of the present invention can be calculated and defined according to various schemes except the aforementioned four schemes. For instance, various schemes and algorithms introduced to such literature as 'Iterative Methods for Sparse Linear Systems' can be utilized for a process of calculating the preprocessing filter $V_1$.

As a second embodiment of generating a preprocessing filter, the preprocessing filter $V_1$ can be generated using characteristics of a MIMO channel of an RE. In order to calculate $A_1$ according to the aforementioned first embodiment, a process of calculating $(G_1^\dagger G_1)$ matrix*matrix is required. In order to enhance calculation complexity of the process, the second embodiment calculates the $A_1$ with less complexity by utilizing a MIMO channel of an RE.

Specifically, in a reference RE, $G_1^\dagger G_1$ can be approximated to a diagonal matrix $Z_1$ in Formula 9 in the following.

$$Z_1 \triangleq \begin{bmatrix} g_1^H g_1 & 0 & \cdots & 0 \\ 0 & g_2^H g_2 & \ddots & \vdots \\ \vdots & \ddots & \ddots & 0 \\ 0 & \cdots & 0 & g_{N_s}^H g_{N_s} \end{bmatrix} \approx G_1^\dagger G_1 \quad \text{[Formula 9]}$$

$$G_1 = [g_1 \ g_2 \ \cdots \ g_{N_s}]$$

An approximation process shown in Formula 9 becomes precise when the number of streams ($N_s$) is getting bigger and correlation between channel elements is getting smaller. The approximation process is performed on the basis that off-diagonal terms can be approximated to 0 according to channel characteristics in MIMO environment. According to the aforementioned approximation process, the matrix $A_1$ can be defined as a diagonal matrix shown in Formula 10 in the following.

$$A_1 = Z_1 + R \quad \text{[Formula 10]}$$

Subsequently, since the $A_1$ in Formula 10 can be represented by a diagonal term only, a preprocessing filter $V_1$ can be calculated by applying the Jacobi scheme mentioned earlier in first embodiment to the $A_1$ in Formula 10. In case of the second embodiment, if an error is big in the approximation process, an amount of reducing a repetition count of the numerical analysis algorithm may be not big enough. In particular, a speed of converging into a preferred answer may not be considerably increased.

Figure 11:
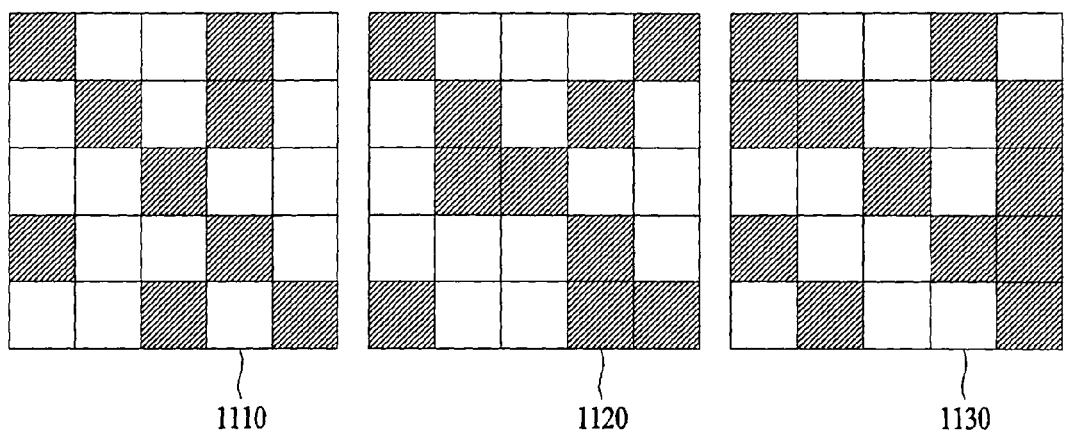
FIG. 11 is a diagram for an example of generating a preprocessing filter generated by a MIMO receiver in accordance with the present invention.

Subsequently, a third embodiment of generating a preprocessing filter is explained with reference to FIG. 11 in the following. FIG. 11 is a diagram for an example of generating a preprocessing filter generated by a MIMO receiver in accordance with the present invention.

In the third embodiment, it may find out $Z_1$ of which an error with the $G_1 G_1^\dagger$ of the first embodiment is small and may be then able to utilize the method proposed by the second embodiment. For instance, if a MIMO channel matrix $G_1$ is approximated into a matrix $\tilde{G}_1$ in a form 1110/1120/1130 shown in FIG. 11, it may considerably reduce complexity for calculating $A_1$. In FIG. 11, a black component and a white component indicate a value of not 0 and a value of 0, respectively. In particular, a size of each component of a channel matrix is compared with a prescribed threshold and a channel size of a component smaller than the threshold is approximated into 0. In this case, a rank of the approximated $\tilde{G}_1$ should be identical to $G_1$.

In the foregoing description, three embodiments for calculating the preprocessing filter $V_1$ have been explained. In the following, a numerical analysis algorithm detecting a detection signal by utilizing a preprocessing filter is explained.

The numerical analysis algorithm is substituted for an inverse matrix calculation used for detecting and generating a detection signal for a whole RE group such as MMSE, ZF (zero forcing), IRC (interference rejection combining), BLAST algorithm and the like. The numerical analysis algorithm proposed by the present invention can be applied to all MIMO receivers described on TR 36.866 for NAIC v1.1.0. Since the numerical analysis algorithm corresponds to an algorithm replacing with the aforementioned inverse matrix calculation only, complexity is enhanced compared to a legacy MIMO receiver and detection performance of an identical or similar level can be obtained.

Such an algorithm as a CG (conjugate gradient), a Newton method, a steepest descent method and the like can be utilized as the numerical analysis algorithm. The numerical analysis algorithm calculates a value with a less repetition count (i.e., promptly) using the aforementioned preprocessing filter $V_1$. As correlation is getting bigger between a preprocessing filter-generated reference RE and other RE, an effect of reducing the repetition count can be increased.

The numerical analysis algorithm is explained in detail with reference to FIG. 8 and a CG algorithm. The CG algorithm corresponds to an algorithm repeatedly calculating until a predetermined accuracy is drawn. The CG algorithm corresponds to a converging algorithm and a result is drawn in a direction of reducing an error according to repetition of the algorithm.

First of all, a MIMO receiver forms such an RE group as shown in FIG. 6 in a manner of binding a plurality of REs of which correlation is higher than a prescribed level. One RE belonging to the RE group becomes a reference RE (first RE) and the MIMO receiver generates a preprocessing filter using a MIMO channel of the reference RE. The reference RE may correspond to an RE which is closest to a center in time axis/frequency axis among the RE group, by which the present invention may be non-limited.

The MIMO receiver generates a detection signal $\hat{s}_l$ by applying the numerical analysis algorithm (CG algorithm) to other REs belonging to the RE group based on the preprocessing filter $V_1$ of the reference RE. The CG algorithm can be implemented by a form shown in Formula 11 in the following.

$$\hat{s}^{(0)} = I_{N_s \times 1}$$
$$t = G_l^H G_l \hat{s}^{(0)} + R\hat{s}^{(0)}$$
$$b = G_l^H y_l$$
$$g^{(0)} = b - t$$
$$d^{(0)} = V_1 g^{(0)}$$
while
$$\|g^{(i)}\| > \delta \|g^{(0)}\| \text{ do}$$
$$t = (g^{(i)})^\dagger V_1 g^{(i)}$$
$$t = G_l^H G_l d^{(i)} + R d^{(i)}$$
$$\alpha^{(i)} = \frac{t}{(d^{(i)})^\dagger t}$$
$$\hat{s}^{(i+1)} = \hat{s}^{(i)} + \alpha^{(i)} d^{(i)}$$
$$g^{(i+1)} = g^{(i)} - \alpha^{(i)} t$$
$$\beta^{(i+1)} = \frac{(g^{(i+1)})^\dagger V_1 g^{(i+1)}}{t}$$
$$d^{(i+1)} = V_1 g^{(i+1)} + \beta^{(i+1)} d^{(i)}$$
end while
$$\hat{s}_l = s^{(end)}$$

[Formula 11]

In Formula 11, $\hat{S}^{(i)}$ is a transmission signal estimated by an $i^{th}$ repetition of a numerical analysis algorithm. A transmission signal estimated by a $0^{th}$ repetition, i.e., an initial value $\hat{S}^{(0)}$ is configured by a vector of which all entries are configured by 1. $\hat{g}^{(i)}$, $\hat{d}^{(i)}$, and $b^{(i)}$ indicate temporary vectors used for obtaining a value and $f_1$, $f_2$ correspond to functions determining a relation between the temporary vectors. $\hat{g}^{(i)}$ vector corresponds to a gradient vector and indicates a fastest direction of which the repeatedly performed algorithm proceeds to a precise answer. In this case, if a difference between an updated $g_{(i)}$ vector and an initially generated $g^{(0)}$ is less than a specific threshold value, the repetition of the algorithm is stopped. In particular, an error size between a result of directly calculating an MMSE filter and a second signal can be indirectly known via a size of the $\hat{g}^{(i)}$ vector. If a $g^{(i)}$ value corresponds to 0, the different between the second signal and the result obtained by using the MMSE filter becomes 0.

In Formula 11, $\delta$ determines an end point of the algorithm and may indicate an accuracy targeted by the algorithm. The $\delta$ can be automatically determined by a system or can be determined by an input of a user. As a size of the $\delta$ is smaller, the algorithm is more repeatedly performed but accuracy of a result is enhanced. On the contrary, as the size of the $\delta$ is bigger, the algorithm is less repeatedly performed but accuracy of a result is degraded. In particular, a permissible error between a value obtained using the CG algorithm and a value obtained using the MMSE filter is determined according to the size of the $\delta$. A MIMO receiver can provide a trade-off between complexity and performance in a manner of controlling the $\delta$. Meanwhile, if the number of repetition becomes identical to a size of a square matrix, the value obtained using the CG algorithm and the value obtained using the MMSE filter become identical to each other.

According to one embodiment, a MIMO receiver can set a limit on maximum time taken for detecting a detection signal by restricting the number of repeating a numerical analysis algorithm. When time taken for the MIMO receiver to detect a signal of a specific RE is relatively longer than time taken for detecting a signal of a different RE, it may affect total processing time of a whole system. In order to prevent the aforementioned situation from being occurred, time taken for detecting a detection signal can be limited to a specific range.

Detection time can be limited together when the number of repeating the numerical analysis algorithm is restricted. In particular, since time taken for performing each repetition of the numerical analysis algorithm is constant, the MIMO receiver can control repetition time by setting a limit on the number of repeating the algorithm. Meanwhile, when the MIMO receiver sets a limit on the number of repetition, an error between the value obtained using the CG algorithm and the value obtained using the MMSE filter may become bigger and it may act as a trade-off between performance degradation and processing time.

Figure 12:
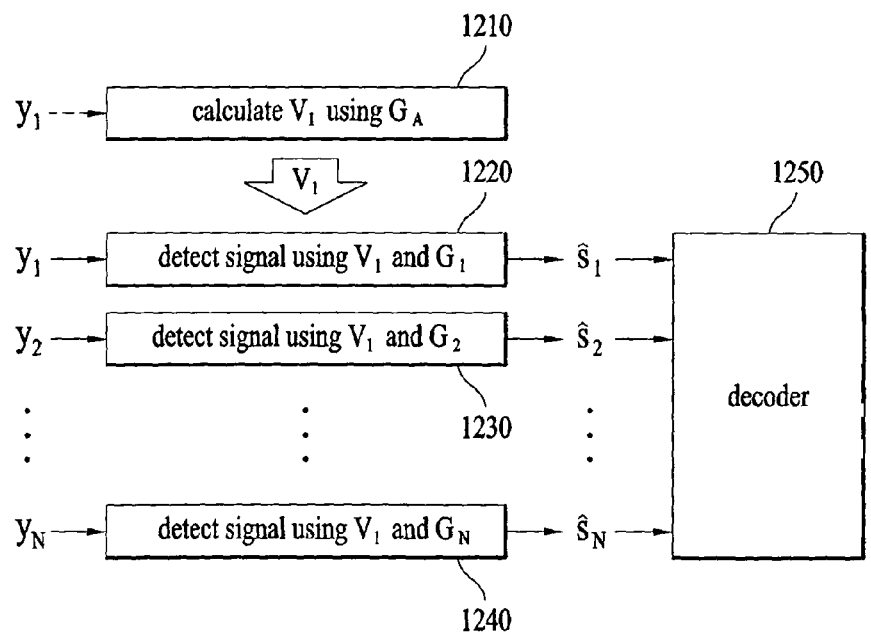
FIG. 12 is a flowchart for an operating process of a MIMO receiver according to a different embodiment of the present invention.

FIG. 12 is a flowchart for an operating process of a MIMO receiver according to a different embodiment of the present invention. FIG. 12 explains a further different embodiment of generating a preprocessing filter $V_1$.

In FIG. 12, a preprocessing filter $V_1$ is calculated using channels of all REs belonging to an RE group. For instance, the $V_1$ can be generated based on $G_A$ calculated in Formula 12.

$$G_A = \frac{1}{N} \sum_{l=1}^{N} w_l G_l$$

[Formula 12]

In Formula 12, N indicates the number of REs belonging to an RE group, $w_l$ indicates a weighted value for each channel matrix. If the $w_l$ corresponds to 1, $G_A$ is defined by an average of all channel matrixes. A MIMO receiver calculates the preprocessing filter $V_1$ to be shared with each other in the RE group based on the channel matrix $G_A$ calculated in Formula 12 [S1210]. Subsequently, the MIMO receiver detects a detection signal for each RE using the preprocessing filter $V_1$ [S1220, S1230, and S1240].

In the foregoing description, embodiment for the MIMO receiver to generate the preprocessing filter $V_1$ and embodiment of generating a detection signal using the $V_1$ are explained with reference to FIG. 8 to FIG. 12. In the following, embodiment of sharing a preprocessing filter with each other in an RE group and embodiment of sharing a reception filter with each other in the RE group are explained with reference to FIG. 13 to FIG. 15.

Figure 13:
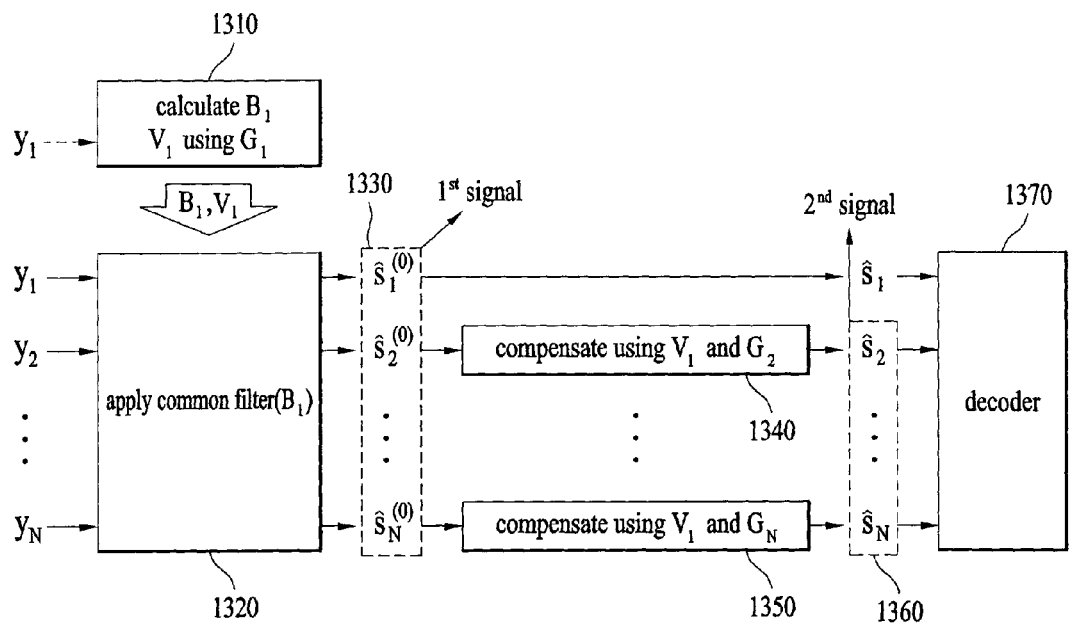
FIG. 13 is a flowchart for an operating process of a MIMO receiver according to a further different embodiment of the present invention.

FIG. 13 is a flowchart for an operating process of a MIMO receiver according to a further different embodiment of the present invention. Unlike FIG. 8, a MIMO receiver generates a preprocessing filter $V_1$ and a reception filter $B_1$ based on a channel $G_1$ of a reference RE belonging to an RE group in FIG. 13 [S1310]. The $V_1$ and the $B_1$ are shared by all REs belonging to the RE group and the MIMO receiver detects a first signal from a reception signal using the reception filter $B_1$ [S1320, S1330]. Subsequently, the MIMO receiver detects a second signal by passing through a process of compensating the first signal by utilizing the preprocessing filter $V_1$ and a numerical analysis algorithm based on a unique channel of each RE [S1340, S1350 and S1360].

The aforementioned process is explained in detail with reference to Formula 13 in the following.

$$b = G_l^H y_l \qquad \text{[Formula 13]}$$
$$\hat{s}^{(0)} = B_1 b$$
$$t = G_l^H G_l \hat{s}^{(0)} + R\hat{s}^{(0)}$$
$$g^{(0)} = b - t$$
$$d^{(0)} = V_1 g^{(0)}$$
$$\text{while}$$
$$\|g^{(i)}\| > \delta \|g^{(0)}\| \text{ do}$$
$$t = (g^{(i)})^\dagger V_1 g^{(i)}$$
$$t = G_l^H G_l d^{(i)} + R d^{(i)}$$
$$\alpha^{(i)} = \frac{t}{(d^{(i)})^\dagger t}$$
$$\hat{s}^{(i+1)} = \hat{s}^{(i)} + \alpha^{(i)} d^{(i)}$$
$$g^{(i+1)} = g^{(i)} - \alpha^{(i)} t$$
$$\beta^{(i+1)} = \frac{(g^{(i+1)})^\dagger V_1 g^{(i+1)}}{t}$$
$$d^{(i+1)} = V_1 g^{(i+1)} + \beta^{(i+1)} d^{(i)}$$
$$\text{end while}$$
$$\hat{s}_l = s^{(end)}$$

In Formula 13, $\hat{s}_l^{(0)}$ indicates a first signal detected from a reception signal of a $l^{th}$ RE using the reception filter $B_1$ generated based on the channel of the reference RE. In Formula 13, a numerical analysis algorithm generates a second signal $\hat{s}_l$ in a manner of compensating the first signal using the preprocessing filter $V_1$ generated from the reference RE. If correlation between the reference RE and a different RE belonging to the RE group is big, the first signal detected by using the commonly used reception filter $B_1$ is similar to the value obtained by directly using the MMSE filter and a process for a numerical analysis algorithm to detect a second signal by compensating the first signal using the preprocessing filter $V_1$ is performed more promptly. On the contrary, if the correlation is small, an error between the first signal and the value obtained by directly using the MMSE filter is big and there is no big difference between the process of detecting the second signal and a case of not using the preprocessing filter.

Meanwhile, embodiment of obtaining a preprocessing filter $V_1$ is explained in the embodiment of FIG. 13. Unlike FIG. 8, since a common reception filter $B_1$ shared in an RE group is calculated in FIG. 13, a process of calculating the preprocessing filter $V_1$ may be different from that of FIG. 8.

First of all, a random matrix $A_1$ is defined based on a channel of a reference RE as shown in Formula 14 in the following.

$$A_1 = G_1^H G_1 + R \qquad \text{[Formula 14]}$$

In Formula 14, the $A_1$ is in an inverse matrix relation with a common reception filter $B_1$. A MIMO receiver can define a preprocessing filter $V_1$ according to three embodiments in the following based on the matrix $A_1$.

First of all, the preprocessing filter $V_1$ may become an inverse matrix of the common reception filter $B_1$. In particular, the common reception filter $B_1$ may become the preprocessing filter $V_1$. The present embodiment can be represented by Formula 15 in the following. If the common reception filter $B_1$ is calculated, a MIMO receiver uses the common reception filter as a preprocessing filter as it is. Since the common reception filter and the preprocessing filter are identical to each other, it is not necessary for the MIMO receiver to additionally calculate the $V_1$ and it is not necessary to have a memory used for calculating and storing the $V_1$.

$$V_1 = A_1^{-1} = B_1 \qquad \text{[Formula 15]}$$

Secondly, the MIMO receiver can calculate the preprocessing filter $V_1$ by disassembling the $A_1$ according to a complete Cholesky factorization scheme. The aforementioned process is performed by passing through three steps according to an order shown in the following.

$$A_1 = L_1 L_1^H \ (L_1 \text{ is a lower triangular matrix}) \qquad \text{i)}$$

$$B_1 = (L_1^H)^{-1} L_1^{-1} \qquad \text{ii)}$$

$$V_1 = (\hat{L}_1^H)^{-1} \hat{L}_1^{-1}, \ \hat{L}_1 \approx L_1$$

If a back substitution calculation process is used, a process of obtaining an inverse matrix of the lower triangular matrix $L_1$ can be omitted in the ii) step. In particular, in the second scheme, in case of applying the $B_1$, $V_1$, complexity can be reduced by utilizing the back substitution calculation process. In this case, main complexity occurs in the i) step among the total process of generating the preprocessing filter $V_1$ and the common reception filter $B_1$.

Meanwhile, the iii) step corresponds to a step of generating a sparse preprocessing filter (a matrix of which most of elements of the matrix corresponds to 0) via an approximation process of $\hat{L}_1 \approx L_1$. If a preprocessing filter corresponds to a sparse filter, calculation complexity occurring in every repetition of a numerical analysis algorithm can be considerably reduced.

As a third method, the preprocessing filter $V_1$ can be calculated according to an incomplete Cholesky factorization scheme. The method is performed by passing through three steps according to an order shown in the following.

$$A_1 \approx \hat{L}_1 \hat{L}_1^H \ (\hat{L}_1 \text{ is a lower triangular matrix}) \qquad \text{i)}$$

$$B_1 = (\hat{L}_1^H)^{-1} \hat{L}_1^{-1} \qquad \text{ii)}$$

$$V_1 = (\hat{L}_1^H)^{-1} \hat{\hat{L}}_1^{-1} \qquad \text{iii)}$$

In the second embodiment, main complexity of a process of generating the preprocessing filter $V_1$ and the common reception filter $B_1$ occurs in the step i). Hence, $\hat{L}_1$ is calculated using the incomplete Cholesky factorization instead of the complete Cholesky factorization scheme in the step i) in the third embodiment.

In case of calculating the preprocessing filter $V_1$ and the common reception filter $B_1$ based on the $\hat{L}_1$, unlike the second embodiment, a second signal should be calculated by passing through a compensation process for a reference RE as well. This is because, since the $B_1$ itself corresponds to an approximated inverse matrix, an error may also occur in the reference RE. Consequently, the third embodiment requires least complexity for generating the common reception filter and the preprocessing filter among the three embodiments. Yet, the third embodiment may take largest repetition count in the compensation process.

The aforementioned embodiments are just examples. A preprocessing filter and a common reception filter can be defined in various ways except the aforementioned methods.

Meanwhile, unlike the embodiment explained with reference to FIG. 13 in the foregoing description, a compensation process [S1340, S1350] using a preprocessing filter and a unique channel of an RE can be omitted according to channel correlation between REs. In particular, if correlation between a reference RE and a different RE is sufficiently big, an error of a first signal detected by using a common reception filter $B_1$ is relatively small. Hence, if it is expected that an error of the first signal of an RE affecting performance of a final result is little, a compensation process for the first signal is omitted and the first signal is directly inputted into a decoder [S1370]. In particular, calculation complexity and memory demand required for the compensation process can be reduced.

Figure 14:
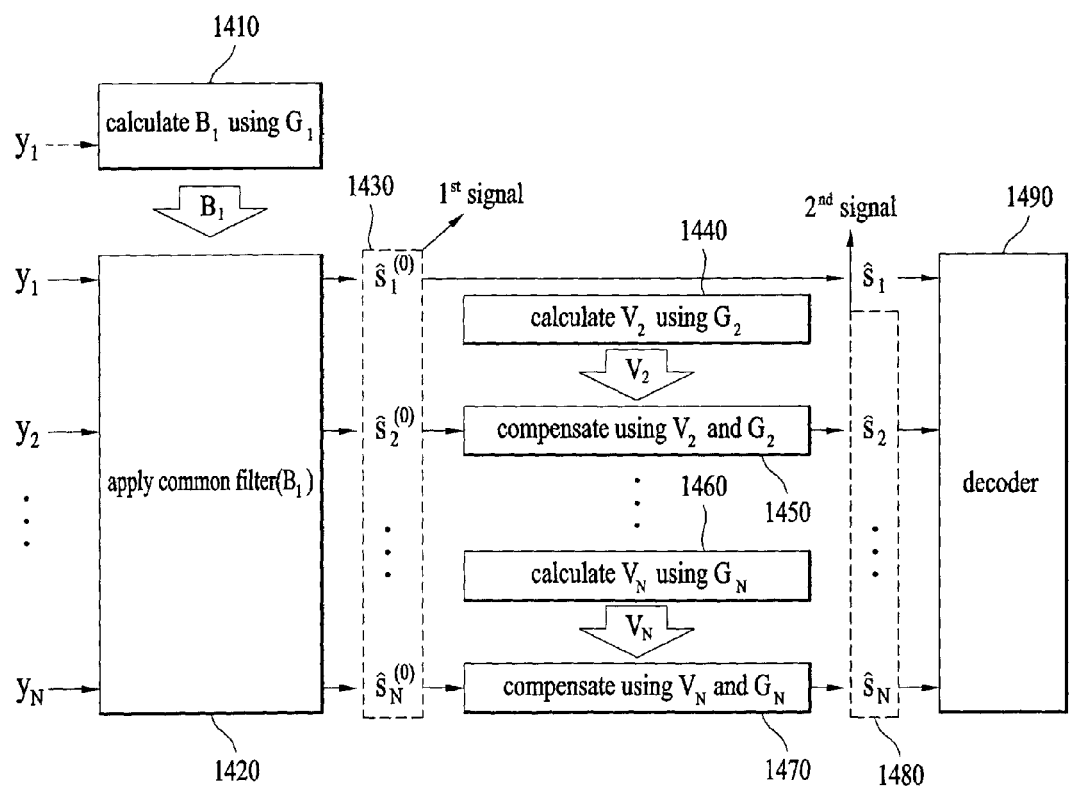
FIG. 14 is a flowchart for an operating process of a MIMO receiver according to a further different embodiment of the present invention.

FIG. 14 is a flowchart for an operating process of a MIMO receiver according to a further different embodiment of the present invention. FIG. 14 is similar to FIG. 13 in that a common reception filter $B_1$ is utilized. Yet, according to the embodiment of FIG. 14, a preprocessing filter $V_1$ is calculated for each RE based on a unique channel of each RE belonging to a RE group instead of a channel of a reference RE. A compensation process of a first signal is performed using the preprocessing filter, which is generated based on not the $V_1$ but the unique channel of each RE.

Specifically, a MIMO receiver calculates a common reception filter $B_1$ based on a channel of a reference RE [S1410]. The $B_1$ is utilized for generating a first signal in a manner of being shared by REs belonging to an RE group [S1430]. Meanwhile, prior to a compensation process for the first signal, the MIMO receiver generates a preprocessing filter based on a unique channel of each RE [S1440, S1460]. In particular, the MIMO receiver calculates $V_Z$ based on $G_Z$ for a second RE [S1440] and calculates $V_N$ based on $G_N$ for an $N^{th}$ RE [S1460].

The embodiments mentioned earlier in FIG. 8 to FIG. 13 can be applied to a process of generating a unique preprocessing filter for each RE. Subsequently, the MIMO receiver performs a compensation process based on a numerical analysis algorithm using the unique preprocessing filter which is generated for each RE [S1450, S1470]. A second signal, which is generated by passing through the compensation process [S1480], is inputted into a decoder and processed [S1490].

According to embodiment of FIG. 14, since a preprocessing filter is generated for each RE, additional complexity is required. Yet, when channel correlation between REs is low, if embodiment of sharing a preprocessing filter is performed according to the scheme mentioned earlier in FIG. 8 to FIG. 13, the number of repetition of the compensation process increases. Hence, the embodiment of FIG. 14 utilizing a unique preprocessing filter is more efficient in reducing total complexity and time taken for calculating.

Moreover, in case of generating a preprocessing filter according to a Jacobi scheme, a Gauss-Seidel scheme, and an SOR preconditioning scheme under an assumption of a back substitution process, complexity increase occurring in the process of calculating the preprocessing filter can be minimized. Hence, it may not be a big burden on the MIMO receiver. Meanwhile, when a lower triangular inverse matrix of N size is processed by the back substitution process, complexity is smaller than $N^2$.

Figure 15:
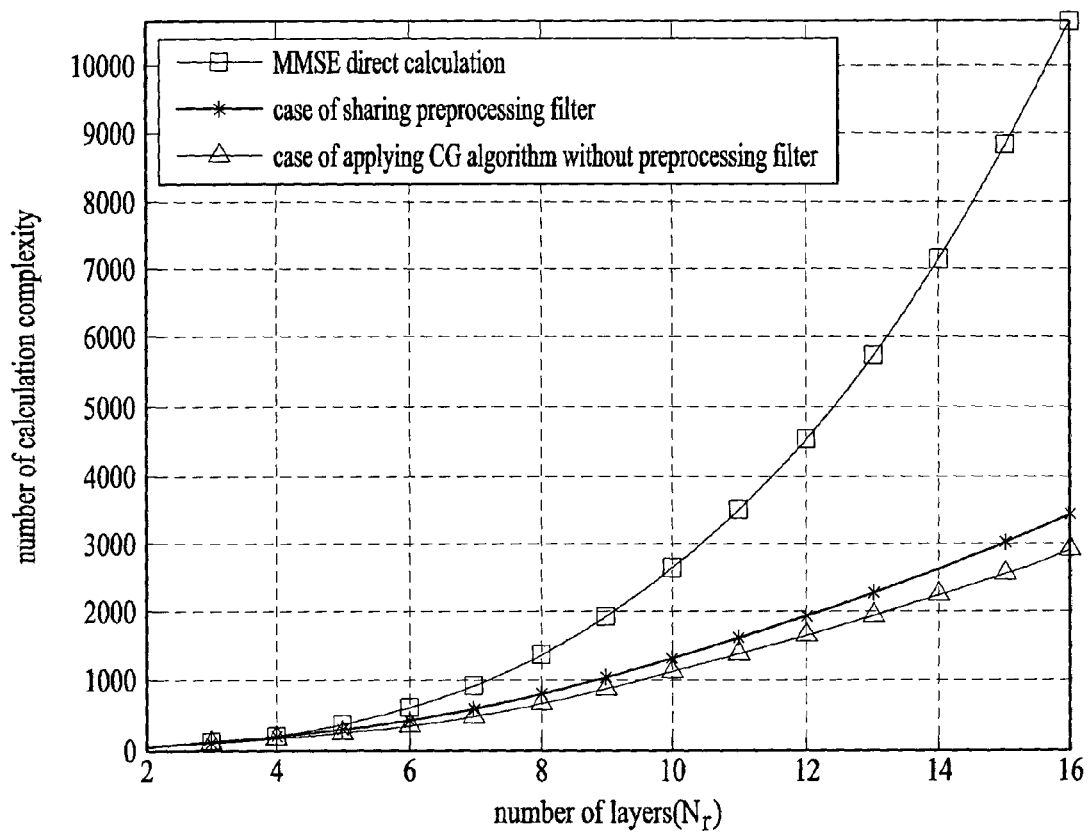
FIG. 15 is a graph for comparing a legacy technology and embodiments of the present invention with each other.

FIG. 15 is a graph for comparing a legacy technology and embodiments of the present invention with each other.

Referring to FIG. 15, a curve on which a quadrangle is displayed in the graph indicates calculation complexity when a signal is detected using an MMSE filter for each of all REs belonging to an RE group. A curve on which a star is displayed in the graph indicates a case that a preprocessing filter $V_1$ is shared in the RE group and a curve on which a triangle is displayed in the graph indicates a case that a compensation process is performed in a manner of sharing a common reception filter $B_1$ with each other although the $V_1$ is not shared in the RE group. As you can see in FIG. 15 by vision, the MIMO receiver proposed by the present invention is able to have more complexity gain as the number of reception streams increases.

According to the embodiments mentioned in the foregoing description, if correlation between all REs belonging to an RE group corresponds to 1, a reception filter $B_i$ of each RE becomes identical to a reception filter $B_1$ of a reference RE. Hence, although the $B_1$ is used only, a first signal can be inputted into a decoder without any performance degradation. By doing so, it is necessary to obtain a single reception filter only in the RE group. Hence, total calculation complexity is reduced to 1/N (N corresponds to the number of REs in the RE group).

If the correlation between REs belonging to the RE group is less than 1, an error of a first signal, which is calculated using a common reception filter $B_1$, is compensated using a preprocessing filter $V_1$. As the correlation between REs is getting bigger, a compensation process of a numerical analysis algorithm using a preprocessing filter is performed more promptly (i.e., repetition count is reduced). In this case, although the compensation process to which the preprocessing filter is applied may have more increased calculation complexity compared to a compensation process to which the preprocessing filter is not applied, repetition count can be more sharply reduced compared to repetition count of the compensation process to which the preprocessing filter is not applied. Consequently, the MIMO receiver proposed by the present invention can reduce complexity while minimizing performance degradation in a manner of maximally using the correlation between REs.

When calculation complexity is needed to be more reduced, the MIMO receiver can more reduce the calculation complexity by taking performance degradation due to an error caused by the compensation process utilizing a preprocessing filter lying down. Hence, the MIMO receiver can provide a trade-off between the calculation complexity and performance.

And, according to a proposed scheme, since an inverse matrix is not directly calculated for REs except a reference RE, all calculations are performed by calculation of 'matrix*vector'. It is difficult to perform distributed processing for inverse matrix calculation. On the contrary, since the calculation of 'matrix*vector' can be easily parallelized, it is able to easily apply a distributed processing scheme to the calculation of 'matrix*vector'. By doing so, total processing time can be sharply reduced.

3. Device Configuration

Figure 16:
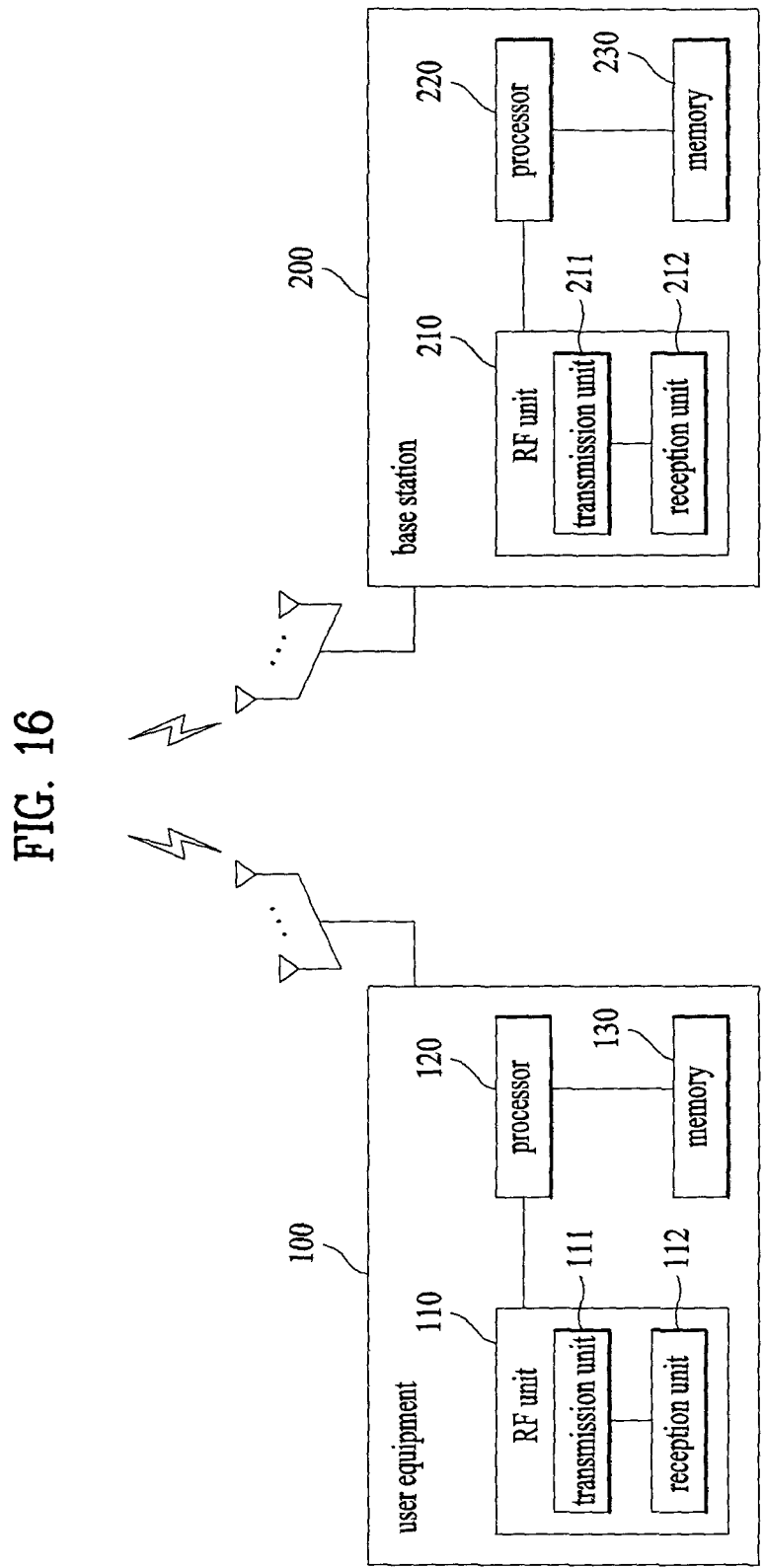
FIG. 16 is a block diagram for a user equipment and a base station in accordance with the present invention.

FIG. 16 is a block diagram for a user equipment and a base station in accordance with the present invention.

In FIG. 16, a user equipment 100 and a base station 200 can include a radio frequency (RF) unit 110/210, a processor 120/220 and a memory 130/230, respectively. Although FIG. 16 shows one-to-one communication environment between the user equipment 100 and the base station 200, communication environment can be constructed between a plurality of user equipment and the base station 200. And, the base station 200 depicted in FIG. 16 can be applied to both a macro cell base station and a small cell base station.

Each of the RF units 110/210 can include a transmission unit 111/211 and a reception unit 112/212, respectively. The transmission unit 111 and the reception unit 112 of the user equipment 100 are configured to transmit and receive a signal with the base station 200 and different user equipments. The processor 120 is functionally connected with the transmission unit 111 and the reception unit 112 and is configured to control the transmission unit 111 and the reception unit 112 to transmit and receive signal with different devices. And, the processor 120 performs various processing on a signal to be transmitted and transmits the signal to the transmission unit 111. The processor performs processing on a signal received by the reception unit 112.

If necessary, the processor 120 can store information included in an exchanged message in the memory 130. The user equipment 100 can perform the aforementioned various embodiments of the present invention with the above-mentioned structure.

The transmission unit 211 and the reception unit 212 of the base station 200 are configured to transmit and receive a signal with a different base station and user equipments. The processor 220 is functionally connected with the transmission unit 211 and the reception unit 212 and is configured to control the transmission unit 211 and the reception unit 211 to transmit and receive signal with different devices. And, the processor 220 performs various processing on a signal to be transmitted and transmits the signal to the transmission unit 211. The processor performs processing on a signal received by the reception unit 212. If necessary, the processor 220 can store information included in an exchanged message in the memory 230. The base station 200 can perform the aforementioned various embodiments of the present invention with the above-mentioned structure.

Each of the processors 120/220 of the user equipment 100 and the base station 200 indicates (e.g., control, adjust, manage) operations in the user equipment 100 and the base station 200. Each of the processors 120/220 can be connected with the memory 130/230 storing program codes and data. The memory 130/230 is connected with the processor 120/220 and stores an operating system, an application, and general files.

The processor 120/220 of the present invention can be named by such a terminology as a controller, a microcontroller, a microprocessor, a microcomputer and the like. Meanwhile, the processor can be implemented by hardware, firmware, software and a combination thereof. In the implementation by hardware, ASICs (application specific integrated circuits), DSPs (digital signal processors), DSPDs (digital signal processing devices), PLDs (programmable logic devices), FPGAs (field programmable gate arrays) and the like configured to perform the present invention can be installed in the processor 120/220.

Meanwhile, the aforementioned method can be written by a program executable in a computer and can be implemented by a general digital computer capable of operating the program using a computer readable medium. And, data structure used for the aforementioned method can be recorded in the computer readable medium in various means. Program storing devices usable for explaining a storing device including an executable computer code to perform various methods of the present invention should not be comprehended as temporary objects such as carrier waves and signals. The computer readable medium includes such a storing medium as a magnetic storing medium (e.g., a ROM, a floppy disk, a hard disk and the like) and an optical reading medium (e.g., a CD-ROM, a DVD and the like).

While the present invention has been described and illustrated herein with reference to the preferred embodiments thereof, it will be apparent to those skilled in the art that various modifications and variations can be made therein without departing from the spirit and scope of the invention. Thus, the disclosed methods should be considered in an explanatory viewpoint instead of a limitative viewpoint. The scope of the present invention is shown at not the detail description of the invention but the appended claims. Thus, it is intended that the present invention covers the modifications and variations of this invention that come within the scope of the appended claims and their equivalents.

The invention claimed is:

1. A method of processing reception signals by a multiple input multiple output (MIMO) receiver having a plurality of antennas, the method comprising:
    selecting a reference resource element (RE) from an RE group including a plurality of REs;
    generating a preprocessing filter to be shared by the plurality of the REs based on channel information of the reference RE; and
    generating detection signals for the plurality of the REs by compensating the reception signals for each of the plurality of the REs using the preprocessing filter and channel information of each of the plurality of the REs,
    wherein the preprocessing filter corresponds to a matrix used for enhancing accuracy of the generation of the detection signals by compensating the reception signals.

2. The method of claim 1, wherein the preprocessing filter is generated using a Jacobi algorithm, a Gauss-Seidel algorithm, a successive over relaxation (SOR) preconditioning algorithm, or an incomplete Cholesky factorization algorithm based on the channel information of the reference RE.

3. The method of claim 1, wherein the generating the preprocessing filter includes generating a diagonal matrix is generated by approximating the channel information of the reference RE and applying a Jacobi algorithm to the diagonal matrix.

4. The method of claim 1, wherein the generating detection signals includes repeatedly compensating the reception signals, until a value of an error between application of a minimum mean square error (MMSE) filter, a zero forcing (ZF) filter and an interference rejection combining (IRC) filter or a Bell Laboratories Layer Space-Time (BLAST) filter applied to each of the plurality of the REs instead of the preprocessing filter and the detection signal falls below a threshold value, and
    wherein the maximum number of times that the compensation of the reception signals is performed is determined according to a MIMO channel environment or a user input.

5. The method of claim 1, wherein the detection signals are generated by applying the preprocessing filter and a conjugate gradient (CG) algorithm, a Newton method algorithm, or a steepest descent method algorithm together with the channel information of each RE to the reception signals.

6. The method of claim 1, wherein the generating the preprocessing filter includes generating the preprocessing filter in consideration of channel information of the plurality of the REs in addition to the channel information of the reference RE.

7. The method of claim 1, further comprising decoding the detection signals for the plurality of the REs.

8. A multiple input multiple output (MIMO) receiver, comprising:
   a plurality of antennas configured to receive reception signals; and
   a processor configured to:
      select a reference resource element (RE) from an RE group including a plurality of REs,
      generate a preprocessing filter to be shared by the plurality of the REs based on channel information of the reference RE, and
      generate detection signals for the plurality of the REs by compensating the reception signals for each of the plurality of the REs using the preprocessing filter and channel information of each of the plurality of the REs,
   wherein the preprocessing filter corresponds to a matrix used for enhancing accuracy of the generation of the detection signals by compensating the reception signals.

9. The receiver of claim 8, wherein the preprocessing filter is generated using a Jacobi algorithm, a Gauss-Seidel algorithm, a successive over relaxation (SOR) preconditioning algorithm, or an incomplete Cholesky factorization algorithm based on the channel information of the reference RE.

10. The receiver of claim 8, wherein the preprocessing filter is generated by generating a diagonal matrix by approximating the channel information of the reference RE and applying a Jacobi algorithm to the diagonal matrix.

11. The receiver of claim 8, wherein the processor is configured to repeatedly compensating the reception signals, until a value of an error between application of a minimum mean square error (MMSE) filter, a zero forcing (ZF) filter and an interference rejection combining (IRC) filter or a Bell Laboratories Layer Space-Time (BLAST) filter applied to each of the plurality of the REs instead of the preprocessing filter and the detection signal falls below threshold value, and
   wherein the maximum number of times that the compensation of the reception signals is performed is determined according to a MIMO channel environment or a user input.

12. The receiver of claim 8, wherein the detection signals are generated by applying the preprocessing filter and a conjugate gradient (CG) algorithm, a Newton method algorithm, or a steepest descent method algorithm together with the channel information of each RE to the reception signals.

13. The receiver of claim 8, wherein the processor is configured to generate the preprocessing filter in consideration of channel information of the plurality of REs in addition to the channel information of the reference RE.

14. The receiver of claim 8, wherein the processor is configured to decode the detection signals for the plurality of the REs.

* * * * *